March 23, 1965

G. F. SIMMONS 3,175,174

CENTERING AND FASTENING MEANS FOR INTERNALLY
SUPPORTED TRANSFORMER

Filed April 11, 1961

Inventor,
Gerald F. Simmons,
by his Attorney.

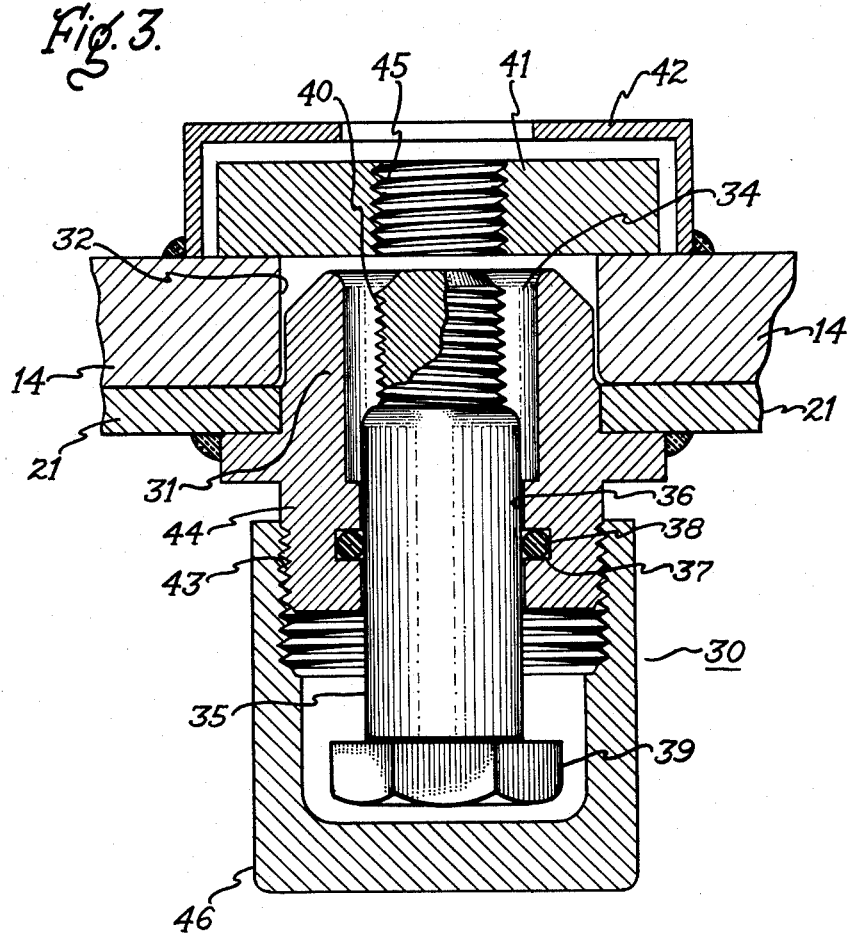

March 23, 1965  G. F. SIMMONS  3,175,174
CENTERING AND FASTENING MEANS FOR INTERNALLY
SUPPORTED TRANSFORMER
Filed April 11, 1961  3 Sheets-Sheet 3

Inventor,
Gerald F. Simmons,
by Gilbert P. Tarleton
His Attorney.

United States Patent Office 3,175,174
Patented Mar. 23, 1965

3,175,174
CENTERING AND FASTENING MEANS FOR INTERNALLY SUPPORTED TRANSFORMER
Gerald F. Simmons, Itasca, Ill., assignor to General Electric Company, a corporation of New York
Filed Apr. 11, 1961, Ser. No. 102,161
11 Claims. (Cl. 336—92)

This invention relates to means for immovably holding stationary electrical induction apparatus such as a power transformer in an enclosure.

It is conventional for many types of electrical apparatus to be contained in a protective enclosure. For example, electrical power transformers are often housed in metallic enclosure tanks; when the transformer is insulated and cooled by a high strength dielectric fluid, the tank may be hermetically sealed to prevent contamination of the fluid by air or moisture. Such enclosure tanks are necessarily slightly larger than the transformer in order to permit insertion and removal of the transformer, and also to provide room for electrical leads and auxiliary equipment associated with the transformer. It is also necessary for portions of the transformer at high electrical potentials to be spaced predetermined distances from the enclosure to provide adequate electrical clearances, since the enclosure is usually at substantially ground potential. Consequently, fastening means are needed to immovably hold the transformer in the enclosure tank in order to prevent the transformer and tank from moving relative to each other and thereby damaging parts of the apparatus.

Various arrangements for holding electrical transformers immovable with respect to their enclosure tanks have been proposed in the past. For example, screw-actuated clamping wedges that extend from the sides or top of an enclosure tank into contact with the sides or top of the transformer have been employed in the past. Although such devices provide satisfactory mechanical rigidity, difficulties have been encountered in accurately positioning the fastening or clamping devices on the enclosure tanks with respect to the parts of the apparatus that the fastening devices engage. The reason for this difficulty is that the prior art fastening devices engaged the transformer at its upper portion or at its sides. Consequently, as the parts of the transformer and the enclosure were fabricated upon each other with normal manufacturing tolerances, the differences in dimensions within the tolerance limits of the various parts often caused the fastening devices and the parts of the transformer they engaged to be misaligned. In other words, the prior art fastening devices were located too far away from a place where cumulative manufacturing tolerance variations do not exist, and hence, their positions could not be accurately controlled. Such a place can be called a "point of origin." In heavy power transformers the points of origin are in the bottom planes of the tank and the transformer assembly because the tank and transformer assembly are fabricated from the bottom to the top independently of each other.

The misalignment of the fastening devices and the transformer sometimes resulted in subjecting part of the transformer to undue mechanical strains that decreased its operating efficiency or increased its noise level, as for example by distorting parts of the transformer that carried current or magnetic flux. To overcome these problems, the parts of the transformer and its enclosure tank were constructed within relatively close tolerances, or else complicated fastening devices were employed. These expedients are unsatisfactory, however, because they increase the cost of the apparatus.

It is, therefore, an object of my invention to provide improved means for fastening electrical induction apparatus in its enclosure that eliminates the difficulties mentioned above.

Another object of the invention is to provide means for fastening electrical induction apparatus to its enclosure that is operable from the exterior of the enclosure.

A further object of the invention is to provide means for fastening or unfastening an electrical induction apparatus from its enclosure that does not break an hermetic or pressure-tight seal on the enclosure.

Another object of the invention is to provide an inexpensive yet rugged arrangement for fastening electrical induction apparatus in its enclosure.

Another object of the invention is to provide means for rigidly fastening a transformer to its enclosure in a manner that reduces mechanical strains that cause higher losses or increased noise.

Another object of the invention is to provide improved fastening means for holding relatively heavy electrical induction apparatus in an enclosuure in which the movable parts of the fastening means are protected from damage caused by shifting of the apparatus within the enclosure.

Other objects and advantages of the invention will be apparent from the specification, drawing, and claims, and the scope of the invention will be pointed out in the claims.

Briefly stated, according to one aspect of my invention, means may be provided for locating and immovably holding electrical apparatus in an enclosure. The holding means may be accurately located with regard to the apparatus when it passes through a protrusion on the inside of the enclosure, and the protrusion is telescoped by a hole in the apparatus.

In the drawing:

FIGURE 3 is an enlarged cross-sectional view of the fastening means shown in FIGURES 1 and 2.

Figure 1:
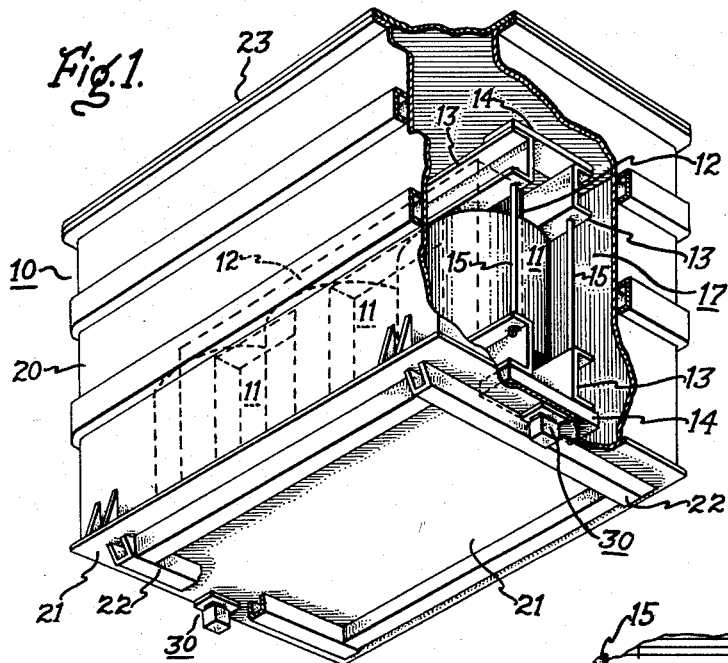
FIGURE 1 is a perspective partially broken-away view of a transformer employing the teachings of my invention, looking upwardly from below the apparatus.

The invention will now be described with reference to the drawing. FIGURE 1 shows a high voltage electrical transformer 10 comprising windings 11 which surround a laminated magnetic core 12 according to conventional practice. The core and windings are held together by a clamping structure comprising upper and lower pairs of channel-shaped clamping members 13. The channel members 13 in each pair are joined by cross-bars 14, and the respective pairs of channels are joined by tierods 15 according to conventional practice. The core 12, windings, and clamping structure 13–15 form a transformer assembly 17 which is enclosed in a tank 20. The cross bars 14 which connect the lower pair of clamping members 13 rest on the bottom 21 of the tank and thus provide support means for the transformer assembly. When tank 20 is filled with a high dielectric strength fluid, such as transformer oil or an electronegative gas, the tank is hermetically sealed to ensure that the dielectric fluid will not leak out or will not be contaminated by air or moisture leaking in. The bottom 21 of the tank 20 may have channels 22 affixed thereto in order to strengthen the tank and to raise the bottom above the ground.

Figure 2:
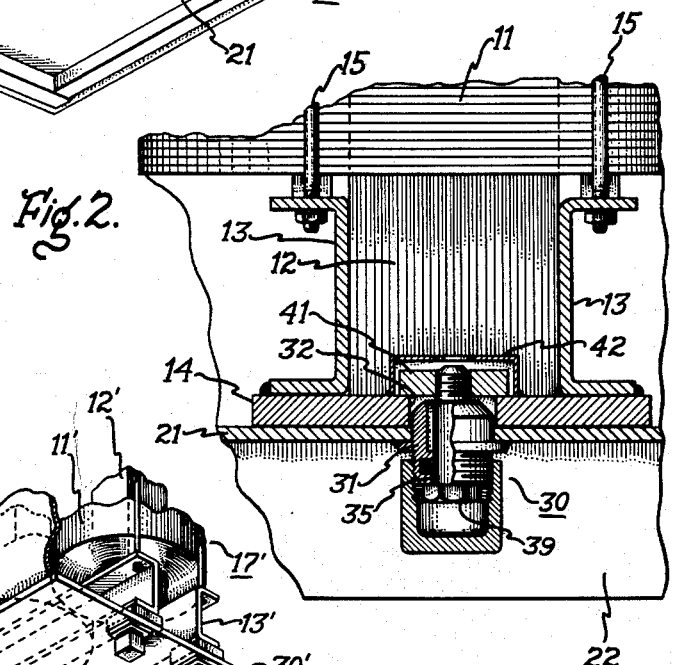
FIGURE 2 is an enlarged, cross-sectional, partially broken-away side view of the apparatus shown in FIGURE 1.

In order to hold the transformer assembly 17 immovable with regard to the enclosure tank 20, fastening means 30 has been provided. Referring now to FIGURES 2 and 3, one embodiment of improved fastening means in accord with my teachings is illustrated. An upwardly extending protrusion 31 is secured by welding to the bottom 21 of the transformer tank 20. The protrusions 31 may have the same exterior configuration as conventional locating pins that have long been used in the art for accurately positioning a transformer in its enclosure. The protrusion 31 is telescopically received by a hole or opening 32 in the cross-bar 14 that joins the lower pair of channel members 13. Several protrusions and mating holes may be provided at various locations in the transformer for assuring accurate alignment of the transformer assembly 17 in the tank 20. In this alignment action the several protrusions 31 serve as locating or positioning pins in the same way that conventional locating pins perform this function.

A protrusion 31 in accord with my teachings serves the additional function of acting as a part of the fastening means for holding a transformer immovable with respect to its enclosure. To this end protrusion 31 has a passageway 34 extending axially therethrough, and a threaded bolt 35 extends through the passageway 34. By passing the bolt 35 through the protrusion 31, the bolt is surrounded by a rigid, relatively thick sleeve of metal that protects it from damage if the transformer assembly and tank shift relative to each other. The passageway 34 may have a narrow portion 36 that closely conforms in diameter to the diameter of the bolt 35. The narrow portion 36 is slightly larger in diameter than the bolt 35 in order to permit the bolt to slide axially through the opening and also to be wiggled slightly for proper alignment. A groove 37 may be provided in the narrow portion 36 and a deformable gasket 38 placed in the groove 37 to maintain a pressure-tight or fluid-tight seal in the tank 20. A head 39 on the bolt 35 extends on the outside of the enclosure 20 so that the fastening means is operable from the exterior of the enclosure. A threaded portion 40 of the bolt 35 extends into the interior of the tank 20 and through the center of the opening 32 for engaging the transformer assembly 17 and rendering the transformer assembly immovable with respect to the tank. A nut 41 may be provided on the interior of the tank on one side of the crossbar 14 for engaging the threads 40. The nut 41 should be substantially coaxially aligned with the hole 32. Restraining means, such as a channel 42, may be secured to the crossbar 14 around the nut 41 for preventing rotation of the nut when it is engaged by the threads 40. A portion 44 of the protrusion 31 that extends on the outside of the tank 20 may be provided with threads 43 which are engaged by a cover 46 for protecting the exposed portion and bolt head 39. The cap 46 also helps to maintain the seal between the tank 20 and the outer atmosphere.

The operation of the fastening means 30 will now be described. The transformer assembly 17 is constructed substantially independently of the enclosure tank 20. When the tank and transformer assembly are substantially complete, the top 23 of the tank 20 may be removed, and the transformer assembly lowered into the tank. The crossbar 14 and protrusions 31 are aligned so that the openings 32 telescopically receive the upwardly extending portion of the protrusions 31. This ensures accurate alignment of the transformer assembly with regard to the tank 20. When the protrusions and the holes that receive them are circular, minimum difficulty is encountered in telescoping the parts. This is an important feature in power transformers because such apparatus is heavy and relatively massive; hence it is difficult to shift significantly the position of the transformer assembly as it is being lowered into the tank without damaging parts by bumping the assembly into the tank. To secure the transformer assembly 17 immovably with respect to the tank 20, the cap 46 is removed from the fastening means 30 and the bolt 35 is moved axially upwardly through the passageway 34 until it engages the nut 41, which has been previously placed in position within the restraining means 42 before the transformer assembly is lowered into the tank 20. If necessary, the bolt, 35 is wiggled slightly in the passageway 34 until the threads 40 engage the threads 45 on the nut 41. Then, the bolt 35 is rotated by means of a suitable tool applied to the head 39 until the nut 41 tightly clamps the crossbar 14 against the tank bottom 21, The top 22 may then be placed on the tank 20. If it is ever desired to move the transformer assembly 17 out of contact with the tank 20, it is merely necessary to unscrew the bolt 35 until the threads 40 no longer engage the threads 45. Then the transformer assembly 17 can be raised above the bottom 21, and opening of the tank top 22 will permit removal of the assembly 17.

Figure 4:
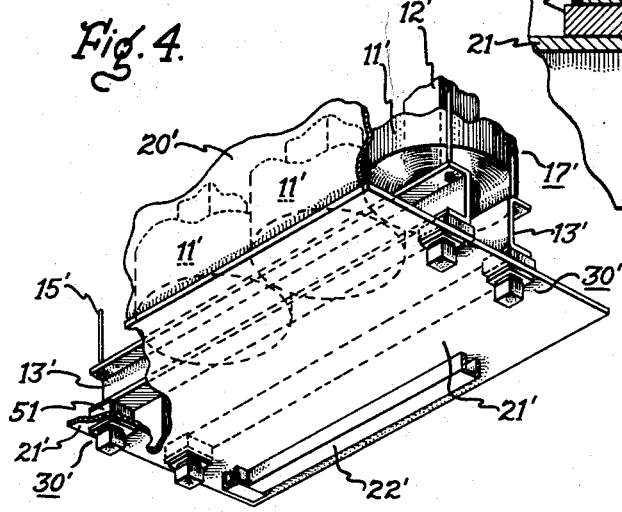
FIGURE 4 is a partially broken-away perspective view of selected parts of a transformer of the type shown in FIGURE 1, illustrating another embodiment of my invention.
Figure 5:
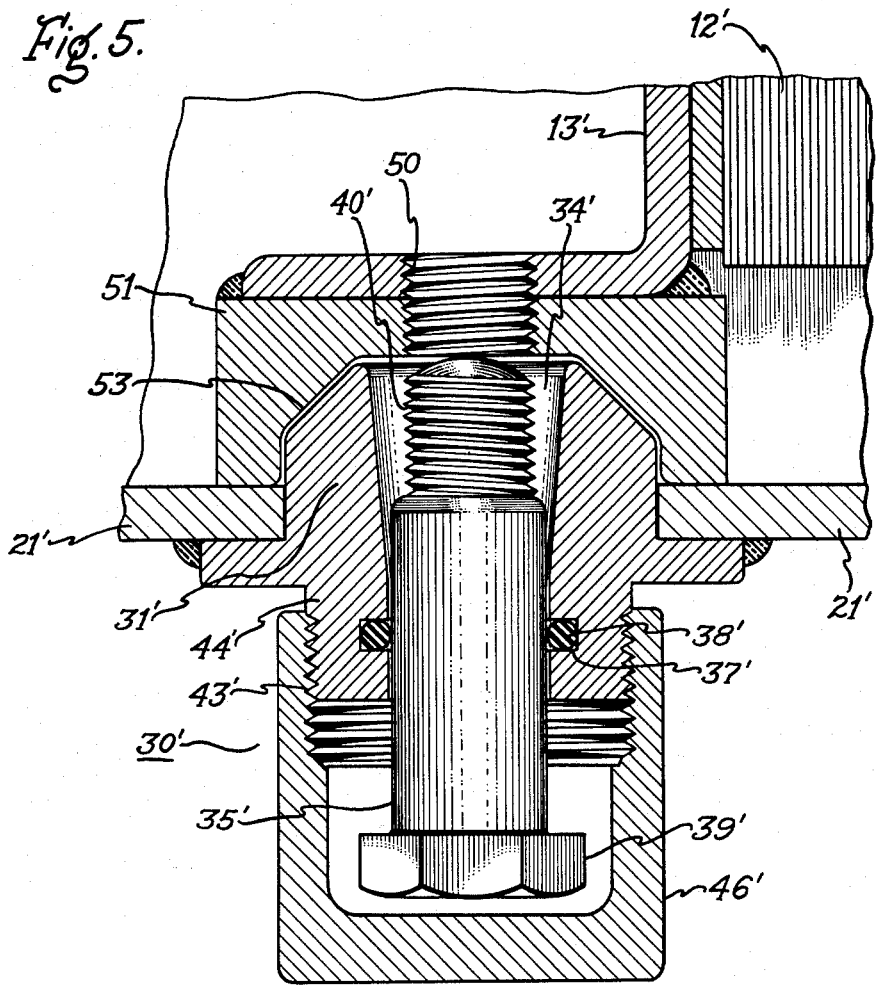
FIGURE 5 is an enlarged, cross-sectional, side view of the fastening means of the embodiment of FIGURE 4.

Referring now to FIGURES 4 and 5, therein is illustrated another embodiment of my invention. It is to be understood that the transformer in FIGURE 4 is the same as that shown in FIGURES 1–2; however, all of the parts thereof have not been illustrated in order to simplify the drawing. The parts of the apparatus in FIGURES 4 and 5 corresponding to those shown in FIGURES 1–3 have been given the same reference numeral with a prime (') being added. In the embodiment of FIGURES 4 and 5 the fastening means 30' is similar to the fastening means in FIGURES 1–3 except that no nut has been provided for engaging the threads 40' on the inwardly extending end of the bolt 35'. The fastening means 30' secures the transformer assembly 17' to the enclosuure 20' by having the threads 40' engage threads on the transformer assembly itself. This is accomplished by providing threads 50 in a portion of the channel member 13' and also in a block 51, which is welded to the underside of the channel 13' to support the transformer assembly above the bottom of the tank. The block 51 has a recess or opening 53 for telescopically receiving the upwardly extending end of the protrusion 31'. The axial opening 34' in the protrusion 31' is tapered rather than being straight in order to avoid shearing and to permit a slight bending of the bolt 35' if the assembly 17 should shift within the tank, as allowed by the tolerances between the hole 53 and the outside diameter of the protrusion 31'. With this arrangement the bolt 35' can perform the function of tightly holding parts 51 and 31' together while being free of any appreciable shearing force which could possibly impair its effectiveness. In all other respects, the operation of the fastening means 30' and the structure thereof are identical to that of the fastening means 30, as previously described with reference to FIGURES 1–3. Those skilled in the art will realize that a protrusion 31', which has a tapered axial passageway 34' can be used in the embodiment of FIGURES 1–3, and that the protrusion 31, in which the passageway 34 is not tapered, can be used in the embodiment of FIGURES 4 and 5.

It has thus been shown that by practicing my invention relatively massive electrical apparatus may be accurately located in its enclosure and then immovably secured in position by fastening means that is operable from the exterior of the enclosure. The fastening means is accurately located with respect to the parts of the apparatus that it engages because the fastening means is located in a place where cumulative manufacturing variations are minimized. In other words, the studs are passed through the protrusions 31 and 31', and the location where the protrusions on the tank enter the holes in the transformer assembly must be located very accurately or else the transformer assembly will not fit into the tank; this is relatively easy to accomplish because these parts are both in planes containing points of origin. Thus, cumulative errors that occur because of differences in sizes of parts within allowable tolerances will not affect the alignment of fastening means located according to my teachings. This ensures that the fastening means can be placed into engagement with the apparatus or disengaged from the apparatus with a minimum of difficulty, and losses or noise caused by mechanical strains are reduced or eliminated.

It will be understood, of course, that while the forms of the invention herein shown and described constitute preferred embodiments of the invention, it is not intended herein to illustrate all of the equivalent forms or ramifications thereof. For example, although the invention has been described and illustrated in terms of means for permanently fastening electrical apparatus to its enclosure, it is to be understood that my invention can be employed when the apparatus is to be only temporarily rendered immovable with regard to its enclosure; thus, my invention finds utility with electrical apparatus of the type disclosed in U.S. patent application 19,080, filed March 31, 1960, by T. J. Twomey, now Patent No. 3,125,735, and assigned to the same assignee as this invention. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. In combination, stationary electrical induction apparatus, an enclosure containing said apparatus, and means for immovably holding said apparatus in said enclosure comprising a protrusion on the inside of said enclosure, there being an opening in said apparatus telescopically receiving said protrusion, and fastening means passing through said protrusion and engaging said apparatus.

2. In combination, stationary electrical induction apparatus, an enclosure containing said apparatus, and means for immovably holding said apparatus in said enclosure comprising an upwardly extending circular protrusion on the inside of said enclosure, there being a circular opening in said apparatus telescopically receiving said protrusion, fastening means passing through said protrusion and engaging said apparatus, and said fastening means being operable from the exterior of said enclosure.

3. An electrical transformer comprising an enclosure containing a transformer core and winding assembly, said enclosure having on the inside thereof an upwardly extending locating pin affixed to its bottom, there being an opening in the bottom of said assembly telescopically receiving said locating pin, said locating pin having an opening extending axially therethrough, fastening means passing through said opening and engaging said assembly, and said fastening means being operable from the exterior of said enclosure.

4. An electrical transformer comprising an enclosure conttaining a transformer core and winding assembly, said enclosure having on the inside thereof an upwardly extending circular protrusion affixed to its bottom, there being a circular opening in the bottom of said assembly telescopically receiving said protrusion, and threaded fastening means passing through said protrusion and engaging threaded means adjacent said hole for clampingly holding said assembly against the bottom of said enclosure, and said fastening means being operable from the exterior of said enclosure.

5. An electrical transformer comprising a fluid-tight enclosure tank containing a transformer core and winding assembly, a dielectric fluid in said enclosure, said tank having on the inside thereof an upwardly extending locating pin affixed to its bottom, said assembly including means for supporting said core and windings above the tank bottom, there being an opening in said support means telescopically receiving said locating pin, said locating pin having a passageway extending axially therethrough, a threaded bolt passing through said opening and being axially and rotatably movable therein, means in said opening maintaining a fluid-tight seal around said bolt, said bolt engaging threaded means adjacent said hole, and said bolt having its head exposed on the outside of said enclosure.

6. A transformer as defined in claim 5 in which the axial opening in said locating pin is tapered to gradually increase in diameter toward the threaded end of said bolt.

7. An electrical transformer comprising an enclosure containing a transformer core and winding assembly, said enclosure having on the inside thereof an upwardly extending locating pin affixed to its bottom, there being a recess in the bottom of said assembly telescopically receiving said locating pin and provided above said pin with a tapped hole, a threaded bolt passing through said locating pin and threadedly engaging said tapped hole in said assembly thereby to fasten said assembly immovably in said container.

8. An electrical transformer comprising an enclosure containing a transformer core and winding assembly, said enclosure having on the inside thereof an upwardly extending locating pin affixed to its bottom, there being a hole in the bottom of said assembly telescopically receiving said locating pin, a threaded bolt passing through an aperture in said locating pin and engaging a threaded nut substantially coaxially aligned with said hole, and said bolt having its head exposed on the outside of said enclosure.

9. A transformer as defined in claim 8 in which means are provided for preventing rotation of said nut.

10. An electrical transformer comprising a core and winding assembly including channel-shaped members clamping a portion of the core therebetween, a fluid-tight tank containing said assembly, said tank having a circular locating pin affixed to its bottom, a portion of said locating pin extending upwardly above the bottom of said tank, said locating pin having an axial passageway therethrough, a threaded bolt passing through said passageway with its head being located on the outside of said tank and its threaded portion being located on the inside of said tank, a cross bar joining said channel-shaped clamping members across the bottom thereof, said cross bar resting on the bottom of said tank and supporting said assembly there above, there being a circular hole in said cross bar telescopically receiving said locating pin, a threaded nut substantially coaxially aligned with the hole in said cross bar, channel means affixed to said cross bar around said nut for preventing rotation thereof, whereby said assembly is tightly clamped against the bottom of said tank by engagement of the threads on said nut and bolt.

11. An electrical transformer comprising a core and winding assembly including channel-shaped members clamping a portion of the core therebetween, a fluid-tight tank containing said assembly, said tank having a circular locating pin affixed to its bottom, a portion of said locating pin extending upwardly above the bottom of said tank, said locating pin having an axial passageway therethrough, a threaded bolt passing through said passageway with its head being located on the outside of said tank and its threaded portion being located on the inside of said tank, a block affixed to the underside of a channel-shaped clamping member, said block resting on the bottom of said tank and supporting said assembly thereabove, there being a circular hole in said block telescopically receiving said locating pin, said block having therein a threaded hole substantially coaxially aligned with the passageway in said locating pin, whereby said assembly is tightly clamped against the bottom of said tank by engagement of the threads on said bolt and the last mentioned threaded hole.

References Cited by the Examiner
UNITED STATES PATENTS

| | | | |
|---|---|---|---|
| 1,677,537 | 7/28 | Werner | 336—92 |
| 2,087,906 | 7/37 | Gaston | 336—92 |
| 2,596,839 | 5/52 | Clausen | 220—75 |
| 2,712,115 | 6/55 | Tubbs | 336—100 |
| 2,822,527 | 2/58 | Terry | 336—100 |
| 3,102,246 | 8/63 | Honey et al. | 336—100 |

JOHN F. BURNS, *Primary Examiner.*

JOHN F. COUCH, *Examiner.*